H. GEISENHÖNER.
CIRCUIT CONTROLLING DEVICE.
APPLICATION FILED JAN. 14, 1907.
910,661.
Patented Jan. 26, 1909.
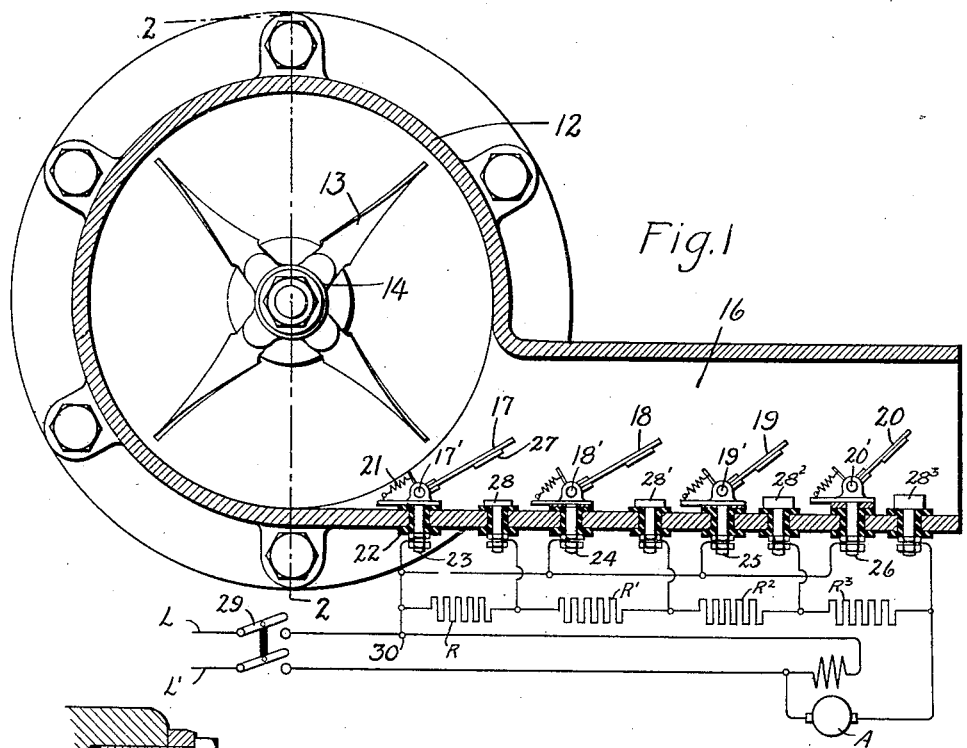
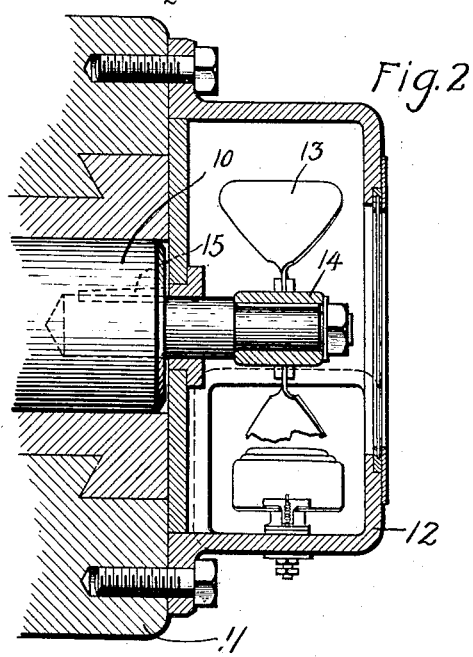
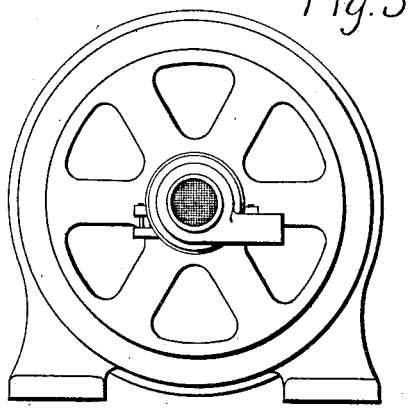
Witnesses:
Lloyd C. Bush
J. Ellis Glen.
Inventor:
Henry Geisenhöner,
By Albert H. Davis
Att'y.

UNITED STATES PATENT OFFICE.

HENRY GEISENHÖNER, OF SCHENECTADY, NEW YORK, ASSIGNOR TO GENERAL ELECTRIC COMPANY, A CORPORATION OF NEW YORK.

CIRCUIT-CONTROLLING DEVICE.

No. 910,661.     Specification of Letters Patent.     Patented Jan. 26, 1909.

Application filed January 14, 1907. Serial No. 352,137.

*To all whom it may concern:*

Be it known that I, HENRY GEISENHÖNER, a citizen of the United States, residing at Schenectady, county of Schenectady, State of New York, have invented certain new and useful Improvements in Circuit-Controlling Devices, of which the following is a specification.

This invention relates to means for controlling electric circuits, and has for its object the provision of a device whereby the wind pressure developed by a rotating part, as for instance the armature of the motor, is utilized to automatically control the electric circuit.

More specifically my invention relates to devices for starting and controlling the speed of electric motors.

The starting of electric motors, especially those of the smaller type, I have found to be readily accomplished by the wind pressure developed from the armature or some other rotating part of the machine. In order to make the action of the starting device more positive I provide a fan or blower for developing a current of air, and I arrange in the path of this current one or more movable members, such for instance as pivoted vanes, which will be acted upon by the air to cut out sections of resistance.

In the accompanying drawing in which I have shown one embodiment of my invention, Figure 1 is a sectional elevation of a starting device or motor equipped with my invention; Fig. 2 is a section of the same on the line 2 2 of Fig. 1; and Fig. 3 is an elevation on a smaller scale of a motor equipped with my invention.

Referring to the drawing, 10 is a shaft mounted to rotate in a journal box 11, the shaft being driven in any desired manner. It may be and preferably is the armature shaft of a motor although my invention is not limited in its application to any particular machine. Secured to the end of the journal box is a casing 12 having a circular portion arranged concentric with the shaft 10 and adapted to inclose a fan or blower. This fan may be of any standard construction and comprises blades 13 secured to a hub 14 which hub is driven from the shaft 10 in any desired manner, as for instance by being inserted in and keyed to shaft 10 by key 15. The outlet or delivery conduit of the fan is a rectangular trough 16 in which are mounted a plurality of vanes 17, 18, 19 and 20. These vanes are each pivotally mounted respectively at the points 17', 18', 19' and 20', and are held in a raised position so as to intercept the current of air passing through the trough by means of springs 21. The vanes are insulated from the trough by means of bushings 22, and the pivotal points, which are on the studs 23, 24, 25 and 26, form terminals for electric conductors. The free end of each vane is also provided with a contact 27 coöperating with the conducting studs 28, 28', 28² and 28³ which are mounted in but insulated from the trough. These studs are connected to the terminals of starting resistances R, R', R² and R³ in such a way that when the vanes are in their normal position, the resistances are all in series but as each vane goes down into contact with its stud, the corresponding section of resistance will be cut out.

The arrangements of circuits and the method of operating my device is as follows: To start the motor the switch 29 is closed whereupon current passes from the line L through the resistances R, R', R² and R³ in series thence through the armature A and back to the line at L'. The motor will thereupon start the fan 13 which will revolve at a slow speed, generating a current of air which will be approximately proportionate to the speed of rotation. I have shown the vanes 17, 18, 19 and 20 as being of different sizes, that is, decreasing in area from the largest one 17 to the smallest one 20. This will, of course, have the effect of closing them successively, the one having the largest area being closed first and the others following in order. Other means may, of course, be provided for causing the vanes to operate successively, such for instance as having the tension of the springs 21 adjusted so as to bring about this result. As the motor speeds up, the vane 17 is forced by the air down into contact with the stud 28 so as to short-circuit the section of resistance R. The current then passes from junction 30 to stud 23, thence across vane 17 to stud 28, resistances R', R², and R³ to the armature A and back to line. In this way the motor will be further speeded up whereupon the next vane will be forced downward into contact with its stud, cutting out the next section of resistance and further speeding up the motor. This operation will continue until all of the resistance is cut out. To stop the motor, the switch is opened and the reverse operation takes place, the vane 20 rising first from its stud and the rest following in their order.

It will be understood, of course, that the arrangement which I have shown is intended for purposes of illustration merely. Many other methods may be, of course, resorted to in bringing about the result which is the object of my invention to produce without departing from the spirit thereof, the scope of which I have set forth in the appended claims.

What I claim as new, and desire to secure by Letters Patent of the United States, is,—

1. The combination with an electric motor of means for starting the same comprising a resistance and a device actuated by wind pressure from the motor for cutting out said resistance.

2. The combination with an electric motor of means for controlling the same comprising a resistance, and a plurality of vanes arranged to be operated by wind pressure from the motor for varying said resistance.

3. The combination with an electric motor of means for controlling the same comprising a resistance, and a movable vane normally in the path of a current of air from the motor and arranged to be actuated thereby to cut out said resistance.

4. The combination with an electric motor of means for controlling the same comprising a resistance, and a plurality of movable vanes normally in the path of a current of air from the motor and arranged to be successively actuated thereby to cut out sections of said resistance.

5. The combination with an electric motor of means for controlling the same comprising a resistance, and a plurality of pivoted vanes spring-pressed into the path of a current of air from the motor and arranged to be successively actuated thereby to short-circuit sections of said resistance.

6. The combination with an electric motor of means for controlling the same comprising a resistance, and a pivoted vane spring-pressed into the path of a current of air from the motor and actuated thereby to vary said resistance.

7. The combination with an electric motor of means driven thereby for producing a current of air, a resistance, and a movable device in the path of said current and actuated thereby to vary the said resistance.

8. The combination with an electric motor of a fan driven thereby for producing a current of air, a resistance, and a movable vane actuated by said current to vary the resistance.

9. The combination with an electric motor of a fan driven thereby for producing a current of air, a resistance, and a pivoted vane spring-pressed into the path of said current and actuated thereby to vary the resistance.

10. The combination with an electric motor of a fan driven thereby for producing a current of air, a resistance, and a plurality of pivoted vanes spring-pressed into the path of the said current and arranged so as to be successively actuated by the current to cut out sections of said resistance.

11. A controller for electric circuits comprising a fan for producing a current of air, a resistance, and a movable device in the path of said current and actuated thereby to vary the said resistance.

12. A controller for electric circuits comprising a fan for producing a current of air, a resistance, and a plurality of devices normally in the path of the said current and arranged so as to be successively actuated by the said air current to cut out sections of said resistance.

13. A starting device for electric motors comprising a fan for producing a current of air, a resistance, and a pivoted vane spring-pressed into the path of the said current and actuated thereby to short-circuit said resistance.

14. A starting device for electric motors comprising a fan for producing a current of air, a resistance, and a plurality of pivoted vanes spring-pressed into the path of the said current and actuated thereby to successively cut out sections of said resistance.

15. A starting device for electric motors comprising a fan for producing a current of air, a resistance, and a plurality of pivoted vanes having progressively varying areas spring-pressed into the path of the said current and successively actuated thereby to cut out sections of said resistance.

16. A starting device for electric motors comprising a fan for producing a current of air, a resistance, and a plurality of movable vanes spring-pressed into the path of the said current and successively movable by increasing pressures to cut out sections of said resistance.

17. The combination with an electric motor, a starting resistance therefor, of a fluid pressure device actuated by the motor, and a switching mechanism arranged to successively cut out the starting resistance as the fluid pressure rises.

In witness whereof, I have hereunto set my hand this 11th day of January, 1907.

HENRY GEISENHÖNER.

Witnesses:
BENJAMIN B. HULL,
HELEN ORFORD.